United States Patent
Ratliff

[11] Patent Number: 6,157,509
[45] Date of Patent: Dec. 5, 2000

[54] EXTENDING ACTUATOR RANGE THROUGH MAGNETIC FLUX REVERSAL DETECTION

[75] Inventor: Ryan T. Ratliff, Oklahoma City, Okla.

[73] Assignee: Seagate Technology LLC, Scotts Valley, Calif.

[21] Appl. No.: 09/406,595

[22] Filed: Sep. 24, 1999

Related U.S. Application Data

[60] Provisional application No. 60/101,899, Sep. 25, 1998.

[51] Int. Cl.[7] ............................... G11B 5/54; G11B 21/12
[52] U.S. Cl. ............................................. 360/75; 318/128
[58] Field of Search ................................... 360/75, 78.04, 360/250, 254, 254.2, 254.6, 255, 255.1, 255.5, 255.9, 264.7, 264.8, 264.9, 265; 318/560, 561, 671, 686, 126, 127, 128

[56] References Cited

U.S. PATENT DOCUMENTS

| | | |
|---|---|---|
| 4,145,725 | 3/1979 | Wallis . |
| 4,286,298 | 8/1981 | Rinkleib . |
| 4,314,291 | 2/1982 | Oda et al. . |
| 4,516,177 | 5/1985 | Moon et al. . |
| 4,772,974 | 9/1988 | Moon et al. . |
| 4,899,234 | 2/1990 | Genheimer . |
| 5,003,415 | 3/1991 | Freeze . |
| 5,128,812 | 7/1992 | Uno . |
| 5,216,647 | 6/1993 | Kitani . |
| 5,262,907 | 11/1993 | Duffy et al. . |
| 5,621,591 | 4/1997 | Rahimi et al. ........................ 360/265 |
| 5,914,836 | 6/1999 | Pottebaum . |

*Primary Examiner*—Andrew L. Sniezek
*Assistant Examiner*—James L Habermehl
*Attorney, Agent, or Firm*—Crowe & Dunlevy

[57] ABSTRACT

Apparatus and method for increasing sweep angle of a rotary actuator in a disc drive. The actuator supports a head adjacent a surface of a disc and an actuator coil adjacent a permanent magnet assembly. The actuator coil has first and second active lengths which magnetically interact with adjacent first and second magnet portions of the permanent magnet assembly, with the permanent magnet assembly generating a magnetic flux reversal at a transition zone between the first and second magnet portions. The head is moved by applying current in a first direction to move the actuator coil in a selected coil direction, thereby causing a selected one of the first and second active lengths to cross the transition zone. The polarity of the current is then reversed so that the current is applied in a second direction opposite the first direction, which causes the actuator coil to continue to move in the selected coil direction.

11 Claims, 5 Drawing Sheets

EXTENDING ACTUATOR RANGE THROUGH MAGNETIC FLUX REVERSAL DETECTION

RELATED APPLICATIONS

This application claims priority to Provisional Application No. 60/101,899 filed Sep. 25, 1998.

FIELD OF THE INVENTION

This invention relates generally to the field of disc drive storage devices, and more particularly, but not by way of limitation, to improvements in the manner in which a head is moved across the surface of a rotatable disc.

BACKGROUND OF THE INVENTION

Hard disc drives are commonly used as the primary data storage and retrieval devices in modern computer systems. In a typical disc drive, user data are magnetically stored on one or more discs that are rotated at a constant high speed. A rotary actuator supports a plurality of read/write heads that fly adjacent the surfaces of the discs to write data to and read data from tracks defined on the discs.

A voice coil motor (VCM) is used to rotate the actuator, with a typical VCM comprising a magnetic circuit which uses an array of permanent magnets and magnetically permeable pole pieces to generate a magnetic field. A coil of the actuator assembly is immersed in this magnetic field. Application of current to the coil establishes a second magnetic field which interacts with the magnetic field of the magnetic circuit to cause the coil to move laterally, pivoting the actuator about a pivot shaft adjacent the discs. As the actuator pivots, the heads are moved across the disc surfaces. Position information is detected from servo data written to the tracks and used by a servo circuit to control the bidirectional application of current to the coil. A typical processor based digital servo system is described by U.S. Pat. No. 5,262,907, assigned to the assignee of the present invention.

When the disc drive is deactivated, the rotating discs are brought to a stop and the heads are moved to a parked position, such as a texturized landing zone near the innermost diameters of the discs, and the actuator is latched to prevent inadvertent movement of the heads out onto the disc surfaces. While the heads are advantageously provided with aerodynamic features which enable the heads to fly in very close proximity to the rotating discs, such features will induce significant adhesive forces ("stiction") against the smooth discs should the heads come to rest on the discs when the discs are not rotating. Such stiction can be sufficiently great to prevent the discs from starting again, so movement of the heads out onto the nonrotating disc surfaces can result in a catastrophic failure of the disc drive.

Accordingly, disc drive manufacturers have attempted to provide ever greater levels of disc drive non-operating mechanical shock resistance, including the implementation of ramps at the outermost diameters of the discs which lift the heads up off of the disc surfaces when the disc drive is deactivated. Since the heads are aerodynamically supported above the rotating discs, the leading edges of the ramps extend out over at least a portion of the outermost diameters of the discs to allow the actuator to sweep the heads over to and up the ramps to the final parked position, which is typically beyond the outermost diameters of the discs. Thus, use of ramp loading typically requires an actuator to operate over a greater angular range ("sweep angle") than that merely required to access all of the tracks on the disc surfaces.

Increasing the sweep angle of the actuator can be accomplished by increasing the dimensions of the magnetic circuit or the coil, but such design modifications typically result in greater costs due to the extra magnet, steel and wire material required. Also, increasing the mass of the coil affects the size and balance of the actuator, which can adversely impact operational performance of the actuator.

There is a need, therefore, for a way to increase the operational sweep angle of an actuator without using modifications that add size and decrease operational performance of the actuator. It is to such improvements that the present invention is directed.

SUMMARY OF THE INVENTION

The present invention is directed to an apparatus and method for moving a head across a surface of a rotatable disc.

In accordance with preferred embodiments, a disc drive includes an actuator which supports a head adjacent a surface of a disc and an actuator coil adjacent a permanent magnet assembly. The actuator coil has first and second active lengths which magnetically interact with adjacent first and second magnet portions of the permanent magnet assembly, with the permanent magnet assembly generating a magnetic flux reversal at a transition zone between the first and second magnet portions.

The head is moved by applying current in a first direction through the actuator coil to move the actuator coil in a selected coil direction, thereby causing a selected one of the first and second active lengths to cross the transition zone. The polarity of the current is then reversed so that the current is applied through the actuator coil in a second direction opposite the first direction, causing the actuator coil to continue to move in the selected coil direction.

Preferably, the disc drive includes a ramp near the outermost diameter of the disc, so that movement of the coil in the selected coil direction causes the heads to move between a parked position and an operational position over the disc surface. Hence, the methodology can be used to unload the heads onto a ramp at a position beyond the outer diameter of the discs.

By moving a selected active length of the coil across the transition zone and then reversing the polarity of the coil current, the sweep angle of the actuator can be advantageously extended without requiring changes to the mechanical configuration of the disc drive.

These and various other features and advantages which characterize the present invention will be apparent from a reading of the following detailed description and a review of the associated drawings.

BRIEF DESCRIPTION OF THE DRAWINGS

FIG. 8 is a flow chart for a HEAD UNLOAD routine, representative of steps carried out by the disc drive in accordance with preferred embodiments of the present invention to unload the heads from a position over the discs and onto a ramp at a parked position beyond an outermost diameter of the discs.

FIG. 9 is a flow chart for a HEAD UNLOAD routine, representative of steps carried out by the disc drive in accordance with preferred embodiments of the present invention to load the heads over the discs by moving the heads away from the parked position.

DETAILED DESCRIPTION

Figure 1:
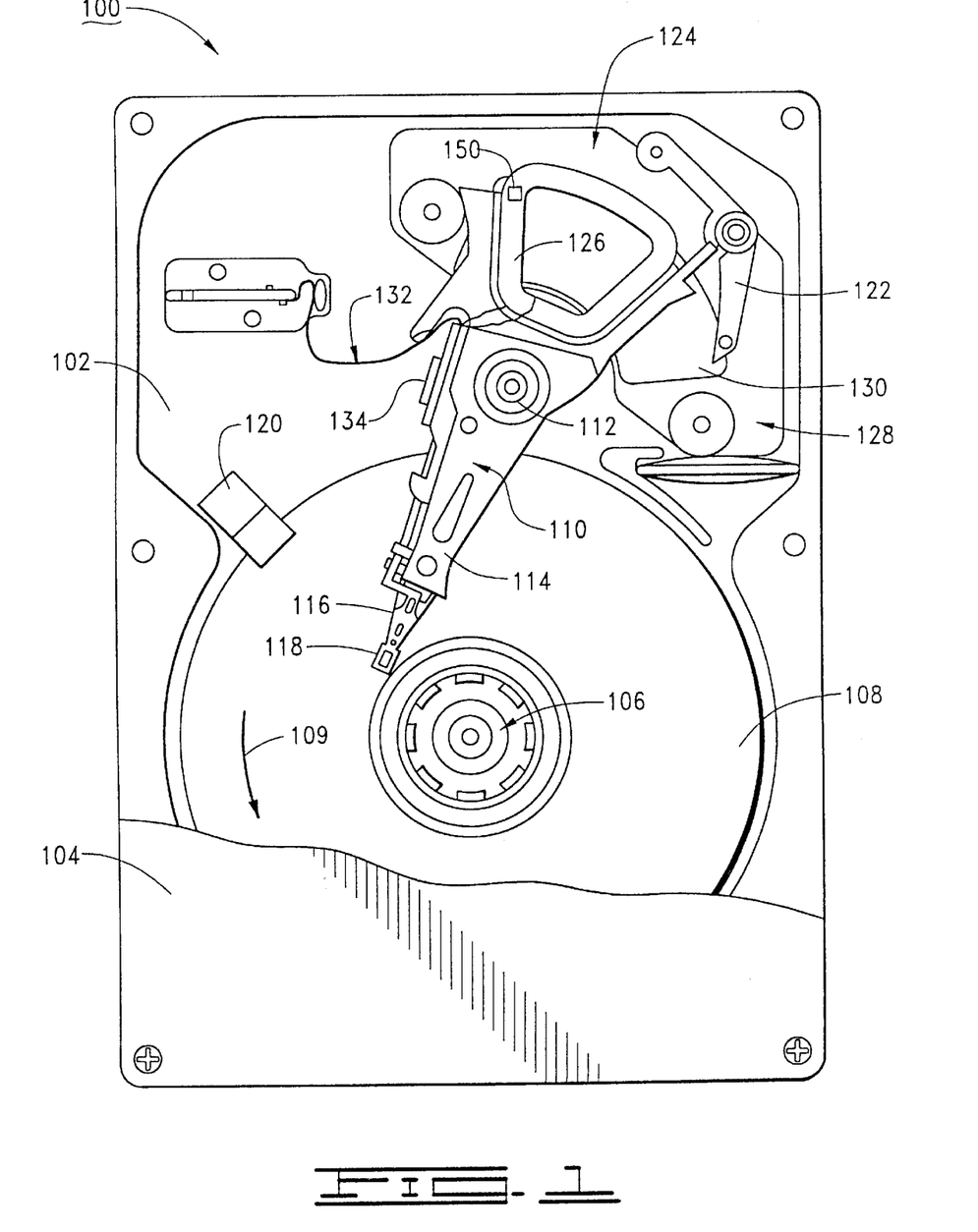
FIG. 1 shows a top plan view of a disc drive constructed in accordance with preferred embodiments of the present invention.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant high speed (in thousands of revolutions per minute) in an angular direction denoted by arrow 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108, with flexible suspension assemblies 116 (flexures) extending therefrom. Mounted at the distal end of each of the flexures 116 is a head 118 which includes a slider assembly (not separately designated) designed to fly in close proximity to the corresponding surface of the associated disc 108. The heads 118 are preferably characterized as magneto-resistive (MR) heads each having a thin-film inductive write element and an MR read element.

When the disc drive 100 is not in use, the heads 118 are moved over and come to rest in a parked position upon ramps 120 at the outermost diameters of the discs 108 and the actuator assembly 110 is secured using a magnetic latch assembly 122. For purposes of the present discussion, the heads 118 are said to be "unloaded" when in the parked position on the ramp 120 and "loaded" when the heads 118 are over the surfaces of the discs 108.

The radial position of the heads 118 is controlled through the use of a voice coil motor (VCM) 124, which includes a moveable coil 126 which is attached to the actuator assembly 110 and a stationary magnetic circuit 128 mounted to the base deck 102. The magnetic circuit 128 uses a permanent magnet assembly 130 to establish a magnetic field in which the coil 126 is immnersed. It will be noted that the magnetic circuit 128 includes an additional magnetic flux path disposed above the coil 126, but has not been shown in FIG. 1 for purposes of clarity. The heads 118 are moved across the surfaces of the discs 108 through the application of current to the coil 126.

A flex assembly 132 provides the requisite electrical connection paths for the actuator assembly 110 while allowing pivotal movement of the actuator assembly 110 during operation. The flex assembly 132 includes a preamplifier/driver circuit 134 (preamp) which applies write currents to the write elements of the heads 118 during a write operation and applies read bias currents to the MR read elements of the heads 118 during a read operation. The preamp 134 further amplifies readback signals obtained during a read operation and provides the same to disc drive control electronics (not shown) disposed on a disc drive printed circuit board (PCB) attached to the underside of the base deck 102.

Figure 2:
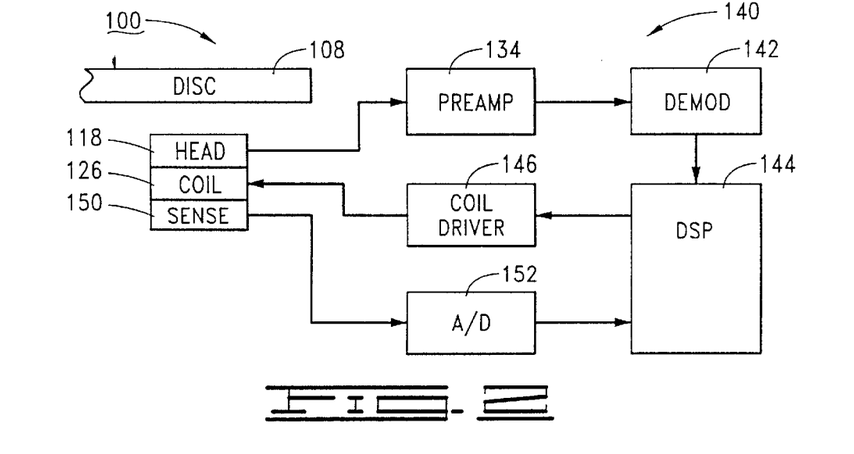
FIG. 2 provides a functional block diagram of a servo circuit of the disc drive of FIG. 1.

FIG. 2 shows a functional block diagram of a servo circuit 140 of the disc drive 100 of FIG. 1 which uses servo data arranged on the discs 108 to control the position of the heads 118. The servo data are transduced by the selected head 118, preamplified by the preamp 134, and provided to a demodulation circuit 142 which conditions the servo data for processing by a servo processor 144, which preferably comprises a digital signal processor (DSP). The DSP 144 uses programming steps stored in DSP memory as well as commands issued by a top-level disc drive processor (not shown) to output current command signals to coil driver circuitry 146 which, in turn, adjusts the amount of current applied to the coil 126.

The diagram of FIG. 2 further shows a magnetic flux transition sense device 150 which is rigidly affixed to the actuator 110 in close proximity to the coil 126, as shown in FIG. 1. The sense device 150 preferably comprises a hall-effect sensor or similar device configured to detect changes in VCM flux density as the actuator coil 126 moves relative to the magnetic circuit 128. The analog output from the sense device 150 is converted to digital form by an analog-to-digital (A/D) converter 152 for use by the DSP 144. Use of the sense device 150 during head loading and unloading operations will be discussed below.

Figure 3:
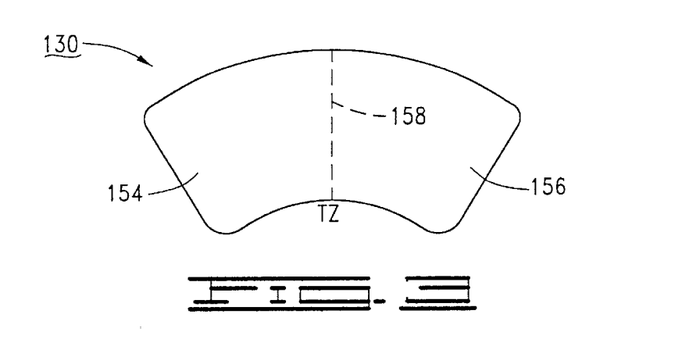
FIG. 3 provides a top plan representation of a permanent magnet assembly of the voice coil motor (VCM) of FIG. 1, showing a transition zone (TZ) at a boundary between adjacent permanent magnets.
Figure 4:
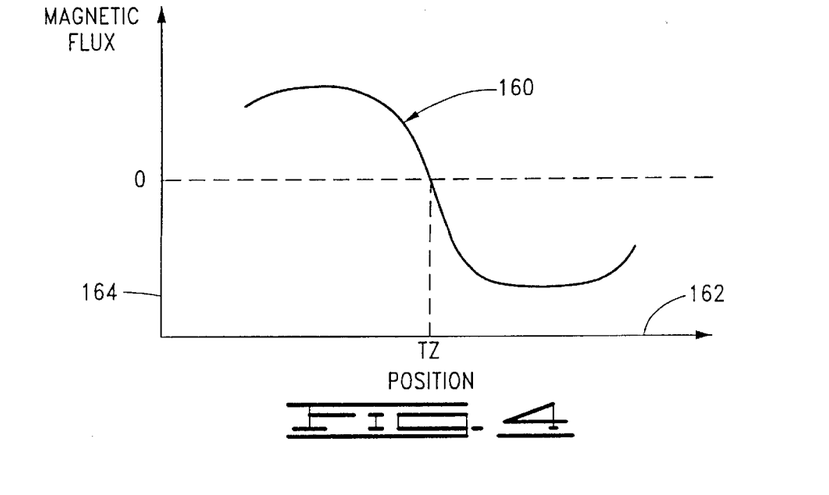
FIG. 4 is a graphical representation of magnitude and polarity of magnetic flux of the VCM, showing a flux reversal at the transition zone of FIG. 3.

FIG. 3 illustrates the permanent magnet assembly 130 of FIG. 1 in greater detail, and shows the assembly to comprise two adjoining magnet portions 154, 156, with a transition zone (TZ) at the boundary therebetween (as indicated by broken line 158). The magnetic flux characteristics of the magnet assembly 130 are illustrated by curve 160 in FIG. 4, plotted against an x-axis 162 indicative of position and a y-axis 164 indicative of flux amplitude and polarity. From FIG. 4, it can be seen that the curve 160 is inversely symmetric, with a flux reversal (i.e., a transitional change in flux polarity) occurring at the transition zone 158.

Figure 5:
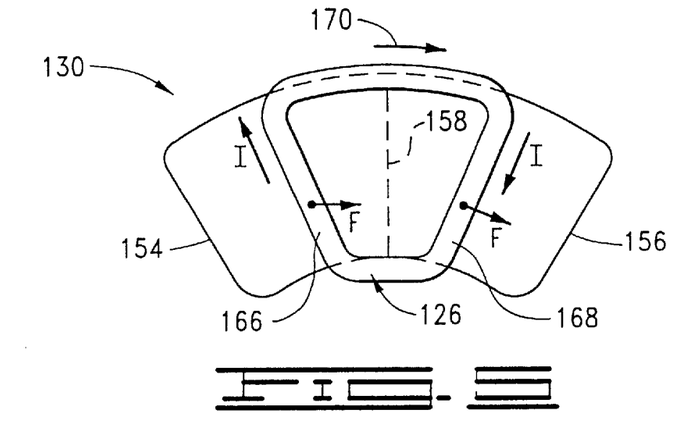
FIG. 5 is a top plan view of the permanent magnet assembly of FIG. 3 in conjunction with the actuator coil of FIG. 1, with current being applied to the coil in a first direction to move the heads of the disc drive to a parked position.

FIG. 5 shows the magnet assembly 130 of FIG. 3 in conjunction with the actuator coil 126. As current (I) is passed through the coil in a first direction (such as that shown), torque forces (F) are induced upon active lengths 166, 168 of the coil 126 in accordance with the Lorenz relation. The coil 126 will accordingly rotate in the direction indicated by arrow 170, sweeping the heads 118 across the surfaces of the discs 108.

Application of current in the opposite direction will likewise provide torque forces in the opposite direction, resulting in movement of the coil 126 in the opposite direction as that shown by arrow 170. Thus, during normal operation the position of the heads 118 is accurately controlled in relation to the polarity and magnitude of the current applied to the coil 126.

Maximum torque is achieved from the VCM 124 by maintaining the active lengths 166, 168 of the coil 126 on each side of the transition zone 158; that is, the active length 166 interacts with the magnet portion 154 and the active length 168 interacts with the magnet portion 156. The purpose for the change in flux polarity at the transition zone 158 will now be apparent: operating both of the active lengths 166, 168 in a magnetic field with the same polarity would result in opposing torque forces, since the applied current passes in one direction along the active length 166, but in the opposite direction along the active length 168.

Figure 6:
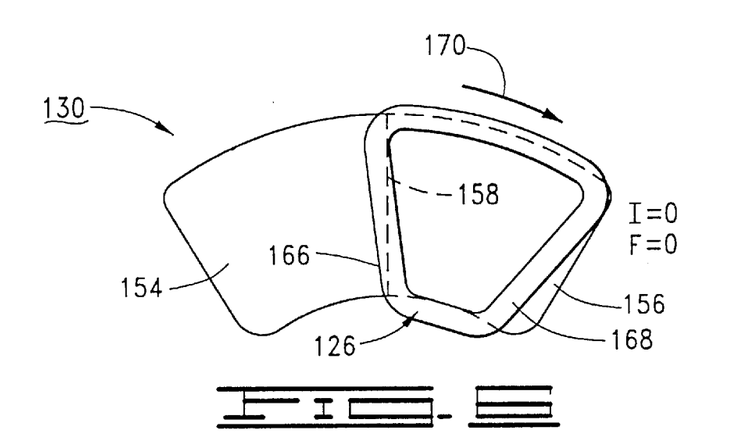
FIG. 6 is similar to FIG. 5, except that one arm of the coil is aligned over the transition zone and no current is being applied to the coil.

Contrawise, substantially zero torque can be obtained when a selected one of the active lengths 166, 168 is disposed over the transition zone 158, as shown for the active length 166 in FIG. 6. However, as discussed below, sufficient momentum can be initially imparted to the coil 126 to allow the coil 126 to continue to move in direction indicated by the arrow 170 and coast past the transition zone 158 to the configuration shown in FIG. 7.

Figure 7:
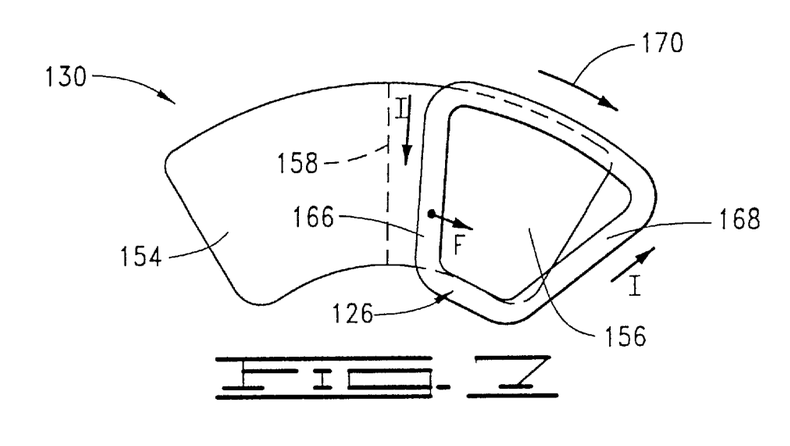
FIG. 7 is similar to FIGS. 5 and 6, except that the arm of the coil is now past the transition zone and current is being applied to the coil in a second direction to continue movement of the heads to the parked position.

In FIG. 7, the active length 166 is shown to be past the transition zone 158 and is now disposed over the magnet portion 156. If the magnet portion 156 was made large enough to accommodate both active lengths 166, 168, the actuator coil 126 could potentially become "stuck" in such a position, since efforts to drive the actuator coil 126 would generate opposing torque forces in each of the active lengths 166, 168. It will be noted, though, that the magnet portion 156 is sized so that the active length 168 is positioned past the end of the magnet portion 156. This essentially limits further magnetic interaction between these two elements, as the effects of magnetic fringing will typically be at a minimum level beyond the edge of the magnet assembly 130.

Continued movement in the direction of arrow 170 can be obtained if current is now applied to the active lengths 166, 168 in a second direction opposite the first direction (shown previously in FIG. 5). Less overall torque will generally be obtained for the same magnitude of current since only one of the active lengths (i.e., length 166) is over the magnet assembly 130, but sufficient torque can nevertheless be generated to rotate the actuator 110 in this configuration.

The foregoing sequence of applying current in a first direction, coasting over the transition zone and then applying current in the opposite direction to increase the angular range (sweep angle) of the actuator 110 will now be discussed more fully with reference to FIGS. 8 and 9. FIG. 8 provides a HEAD UNLOAD routine 200, representative of programming utilized by the DSP 144 of FIG. 2 to move the heads to a parked position (i.e., unloaded onto the ramps 120 shown in FIG. 1). It will be readily apparent that the use of ramps 120 is merely illustrative in nature and the present invention, as claimed below, can be used with other parking schemes such as, for example, texturized landing zones at the innermost diameters of the discs 108.

As represented by step 202, after a period of normal operation for the disc drive 100, a drive shut down sequence is initiated. For example, it is common for disc drives, in response to the removal of supplied power, to utilize the rotational momentum of the spinning discs 108 to generate power for a short amount of time (a few hundred milliseconds) before the discs 108 come to a stop, with this power being used to prepare the disc drive 100 for a deactivated state including the movement of the heads 118 to the parked position. Of course, to save power (such as in portable applications) it is also common to halt further rotation of the discs 108 after an elapsed period of time while maintaining power to the electronics of the disc drive 100 (such as in a "sleep" or "stand-by" mode). Thus, it will be understood that the operation of step 202 represents a command to move the heads 118 to the parked position, irrespective whether power has actually been removed from the drive.

In response to this command, the DSP 144 operates to apply current to the coil 126 in a first direction, step 204, to accelerate the coil 126 in the appropriate direction to cause the heads 118 to move toward the parked position. At this point, the coil 126 will generally be in the normal operation state shown in FIG. 5, with the active lengths 166, 168 of the coil 126 on opposing sides of the transition zone 158. As the current is applied, the DSP 144 monitors the output from the sense device 150 (FIGS. 1 and 2) to determine whether the transition zone 158 has been reached, as indicated by decision step 206.

Once the transition zone 158 is reached, the current is removed from the coil 126 at step 208. This condition is generally represented in FIG. 6. The momentum previously imparted to the coil 126 from step 204, however, will cause the heads 118 to continue to move toward the parked position during this time.

The DSP 144 will continue to monitor the output from the sense device 150 until the coil 126 has moved past the transition zone, decision step 210, after which current is applied to the coil 126 in a second direction opposite the first direction, step 212. This condition is generally represented in FIG. 7.

The routine of FIG. 8 provides a brief period of coasting to allow the active length 168 to substantially clear the edge of the magnet assembly 130 before application of the current in the second direction. Alternatively, the polarity of the coil current could be reversed the moment the transition zone 158 is detected. In either case, it is contemplated that the momentum of the actuator 110 will continue to move the heads 118 in the desired direction, even if (for a short time) the current is applied to the coil 126 while both active lengths 166, 168 are over the same magnet portion.

Although not explicitly shown in the routine of FIG. 8, it will be recognized that velocity of the heads 118 can be readily measured a number of conventional ways, including through detection of the rate at which tracks pass under the heads (through detection of the servo data on the discs), and that such information can be used to adjust the magnitude of the current applied to the coil 126 as the heads 118 are moved to the parked position. It is desirable to bring the heads 118 into the parked position in a controlled fashion: too high a terminal velocity can potentially result in damage to the heads 118 or the actuator 110. Also, when ramp loading is utilized (as preferably envisioned), some minimum amount of velocity is necessary to drive the heads 118 up the ramps into the final parked position.

Adding to the complexity of the head load operation is the variability in the initial position of the heads 118 when the shut down command is issued (step 202); the heads 118 can be at the innermost diameters of the discs 108 when the shutdown sequence is initiated (requiring a large amount of actuator movement to park the heads), or the heads can be at the innermost diameters of the discs 108 (requiring only a small amount of actuator movement to park the heads). Most of the time, the heads 118 will be somewhere in between these two extremes.

Hence, it will be understood that the application of current in the first and second directions, as set forth by the operation of steps 204 and 212, will likely result in the application of variable magnitudes of current in these directions, depending upon the conditions of each particular head parking operation. Nevertheless, the first and second directions of current will both operate to generate torque forces that move the heads 118 toward the parked position. It is further explicitly contemplated that braking current may also be utilized during the operation of step 212 to bring the heads 118 to the final loaded position in situations where the heads 118 approach the ramp 120 at a higher than desired terminal velocity. Interestingly, such braking current will be in the "first" direction (as in step 204), so that current applied in the same direction will initially accelerate, and then later decelerate, the coil 126.

Continuing with the routine of FIG. 8, decision step 214 determines whether the heads 118 have finally reached the parked position, after which point any applied current is thereafter removed at step 216 and the actuator 110 is latched to secure the heads 118 in the parked position, at step 218. The routine then ends at step 220.

Referring now to FIG. 9, shown therein is a HEAD LOAD routine 230, which represents programming steps carried out by the DSP 144 to move the heads 118 from the parked position out to an operational position over the surfaces of the discs 108. It will be understood that the routine of FIG. 9 is carried out to reverse the operation of the routine of FIG. 8.

At step 232, the discs 108 are brought up to a rotational speed sufficient to support the heads 118, after which current is applied to the coil 126 in the first direction to initiate movement of the heads away from the ramps 120. It will be noted that the same convention used in FIG. 8 applies to FIG. 9, so that the "first" direction of step 234 is the same direction as the "first" direction of step 204. During this operation, the coil 126 will be positioned as shown in FIG. 7, except that the directions for current (I), force (F) and movement (arrow 170) will be opposite that shown.

As before, the DSP 144 will use the output from the sense device 150 to detect the transition zone 158 (decision step 236), after which the current will be removed from the coil 126 (step 238) until the active lengths 166, 168 once again straddle the transition zone 158 (decision step 240). Current is next applied as required in the second direction at step 242 to continue to move the heads 118 away from the parked position, after which the disc drive 100 continues with normal initialization functions and initiates normal operation, step 244. The routine then ends at step 246.

It will now be recognized that the present invention, as embodied herein and claimed below, advantageously extends the sweep angle of the actuator 110 without undesirably changing the configuration of the VCM 124. Although routines have been presented in the context of a ramp for unloading the heads, the basic methodology can be extended to other situations, such as parking the heads on texturized landing zones on the discs, or extending the range of the actuator 110 during normal operation.

Depending upon the configuration of a particular drive, it is further contemplated that head unloading and loading can be carried out without use of the sense device 150. For example, upon receipt of a head park command, the actuator 110 could be initially moved to a known position (such as against the inner limit stop to bring the heads 118 toward the innermost radii of the discs 108), after which the current could be applied in the first direction to initiate movement of the heads 118 toward the parked position. If actuator response characteristics are sufficiently repeatable, then a timer could be initiated and after a selected amount of elapsed time, the current could be removed (coincident with passage of the coil 126 over the transition zone 158) and then reversed to the second direction to complete the parking operation.

In summary, the present invention provides a method and apparatus for moving a head across a disc surface. In accordance with preferred embodiments, a disc drive 100 includes an actuator 110 which supports a head 118 adjacent a surface of a disc 108 and an actuator coil 126 adjacent a permanent magnet assembly 130. The actuator coil has first and second active lengths 166, 168 which magnetically interact with adjacent first and second magnet portions 154, 156 of the permanent magnet assembly, with the permanent magnet assembly generating a magnetic flux transition 160 at a transition zone 158.

The head is moved by applying current in a first direction through the actuator coil to move the actuator coil in a selected coil direction 170 and cause a selected one of the first and second active lengths to cross the transition zone (steps 234, 236), and then subsequently applying current through the actuator coil in a second direction opposite the first direction to move the actuator coil in the selected coil direction (step 242).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive having an actuator which supports a head adjacent a disc surface and an actuator coil adjacent a permanent magnet assembly, the actuator coil having first and second active lengths which magnetically interact with adjacent first and second magnet portions of the permanent magnet assembly, the permanent magnet assembly generating a magnetic flux reversal at a transition zone between the first and second magnet portions, a method for moving the head across the disc surface, comprising steps of:

(a) applying current in a first direction to urge the actuator coil in a selected coil direction and cause a selected one of the first and second active lengths to cross the transition zone; and (b) applying current in a second direction opposite the first direction to continue to urge the actuator coil in the selected coil direction.

2. The method of claim 1, further comprising a step of:

(c) subsequently applying current in the first direction to retard movement of the actuator coil in the selected coil direction.

3. The method of claim 1, wherein the applying steps (a) and (b) cooperate to move the head from an operational position over the disc surface to a parked position.

4. The method of claim 1, wherein the applying steps (a) and (b) cooperate to move the head from a parked position to an operational position over the disc surface.

5. The method of claim 1, wherein the applying step (a) further comprises a step of:

(a1) removing the current applied in the first direction to cause the actuator to coast in the selected coil direction.

6. The method of claim 1, wherein the applying step (a) further comprises a step of:

(a1) using a sense device coupled to the actuator coil to detect movement of the selected one of the first and second active lengths across the transition zone.

7. A disc drive, comprising:

a rotatable disc having a disc surface;

an actuator assembly supporting a head adjacent the disc surface, an actuator coil having a plurality of windings that form first and second active lengths, and a sense device which detects change in magnetic flux;

a permanent magnet assembly with adjacent first and second magnet portions and which generates a magnetic flux reversal at a transition zone between the first and second magnet portions; and a servo circuit, coupled to the actuator assembly, which is operably configured to move the head across the disc surface by applying current in a first direction through the actuator coil to urge the actuator coil in a selected coil direction, using the sense device to detect crossing of a selected one of the first and second active lengths over the transition zone, and subsequently applying current through the actuator coil in a second direction opposite the first direction to continue to urge the actuator coil in the selected coil direction.

8. The disc drive of claim 7, wherein the servo circuit is operably configured to subsequently apply current in the first direction through the actuator coil to retard movement of the actuator coil in the selected coil direction.

9. The disc drive of claim 7, further comprising a ramp at an outermost diameter of the disc operably configured to retain the head in a parked position, and wherein movement of the coil in the selected coil direction causes movement of the head from an operational position over the disc surface to the parked position.

10. The disc drive of claim 7, further comprising a ramp at an outermost diameter of the disc operably configured to retain the head in a parked position, and wherein movement of the coil in the selected coil direction causes movement of the head from the parked position to an operational position over the disc surface.

11. A disc drive, comprising:

an actuator which supports a head adjacent a disc surface; and movement means for moving the head by applying current to the actuator in a first direction to urge the head in a selected direction, and then applying the current in a second, opposite direction to continue urging the head in the selected direction across the disc surface.

* * * * *